(12) United States Patent
Mansell

(10) Patent No.: US 7,734,897 B2
(45) Date of Patent: Jun. 8, 2010

(54) ALLOCATION OF MEMORY ACCESS OPERATIONS TO MEMORY ACCESS CAPABLE PIPELINES IN A SUPERSCALAR DATA PROCESSING APPARATUS AND METHOD HAVING A PLURALITY OF EXECUTION THREADS

(75) Inventor: David Hennah Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 776 days.

(21) Appl. No.: 11/312,653

(22) Filed: Dec. 21, 2005

(65) Prior Publication Data

US 2007/0143581 A1 Jun. 21, 2007

(51) Int. Cl.
*G06F 15/76* (2006.01)

(52) U.S. Cl. ......................................... 712/23; 712/225

(58) Field of Classification Search .................... 712/23, 712/225
See application file for complete search history.

(56) References Cited

U.S. PATENT DOCUMENTS

| | | | | |
|---|---|---|---|---|
| 5,838,984 A | * | 11/1998 | Nguyen et al. .................. | 712/5 |
| 5,881,277 A | * | 3/1999 | Bondi et al. ................. | 712/239 |
| 5,944,816 A | * | 8/1999 | Dutton et al. ............... | 712/215 |
| 5,961,632 A | * | 10/1999 | Shiell et al. .................. | 712/212 |
| 6,105,127 A | * | 8/2000 | Kimura et al. ............... | 712/215 |
| 6,209,081 B1 | * | 3/2001 | Kahle et al. .................. | 712/215 |
| 7,035,998 B1 | * | 4/2006 | Nemirovsky et al. ........ | 712/215 |
| 2003/0172250 A1 | * | 9/2003 | Fetzer et al. ................. | 712/206 |
| 2005/0010743 A1 | * | 1/2005 | Tremblay et al. ............. | 712/10 |
| 2006/0179346 A1 | * | 8/2006 | Bishop et al. ................. | 714/13 |

\* cited by examiner

*Primary Examiner*—Eddie P Chan
*Assistant Examiner*—Idriss N Alrobaye
(74) *Attorney, Agent, or Firm*—Nixon & Vanderhye P.C.

(57) ABSTRACT

A superscalar data processing apparatus and method are provided for processing operations, the apparatus having a plurality of execution threads and each execution thread being operable to process a sequence of operations including at least one memory access operation. The superscalar data processing apparatus comprises a plurality of execution pipelines for executing the operations, and issue logic for allocating each operation to one of the execution pipelines for execution by that execution pipeline. At least two of the execution pipelines are memory access capable pipelines which can execute memory access operations, and each memory access capable pipeline is associated with a subset of the plurality of execution threads. The issue logic is arranged, for each execution thread, to allocate any memory access operations of that execution thread to an associated memory access capable pipeline. Such a system has been found to provide an effective balance between increasing the efficiency of operation of the superscalar data processing apparatus when employing multiple execution threads whilst also alleviating the need for complex hardware to handle hazard detection.

10 Claims, 5 Drawing Sheets

ALLOCATION OF MEMORY ACCESS OPERATIONS TO MEMORY ACCESS CAPABLE PIPELINES IN A SUPERSCALAR DATA PROCESSING APPARATUS AND METHOD HAVING A PLURALITY OF EXECUTION THREADS

BACKGROUND OF THE INVENTION

1. Field of the Invention

The present invention relates to a superscalar data processing apparatus and method.

2. Description of the Prior Art

A superscalar architecture implements a form of parallelism within a central processing unit (CPU), thereby allowing the system as a whole to run much faster than it would otherwise be able to at a given clock speed. To achieve this, a superscalar data processing apparatus has a plurality of execution pipelines which can operate in parallel, thereby allowing more than one instruction to be executed in parallel. In a typical superscalar CPU, there are often several functional units of the same type provided within the various pipelines, along with circuitry for dispatching operations specified by the instructions to the various functional units. For instance, it is common for superscalar designs to include more than one arithmetic logic unit (ALU), which allows the dispatcher circuitry to dispatch certain data processing operations for execution in parallel, each operation being dispatched to one of the ALUs.

Often, a superscalar processor is arranged as an in-order machine, where a sequence of instructions are executed in original program order. Such in-order superscalar machines typically use asymmetric execution pipelines, such that the multiple execution pipelines have different capabilities. For example, one execution pipeline may be able to handle a larger number of different types of operations, whereas another execution pipeline may only be able to handle a smaller subset of operations. Typically, only one of the execution pipelines has the ability to handle load or store operations specified by load or store instructions, also referred to herein as memory access instructions. An example of an in-order superscalar processor where only one of the execution pipelines can handle memory access operations is the ARM Cortex A8 processor.

One reason for only allowing one pipeline to handle memory access operations is that it avoids the need to provide hazard detection hardware to detect hazards which could otherwise occur when issuing multiple memory access operations in parallel. A hazard occurs when two operations occur to the same address in quick succession. The hazard types enumerated below refer to the cases where consistency problems arise if the two accesses are processed in the wrong order. A Write after Write (WaW) hazard occurs when there are two writes close together—a subsequent read must return the value written by the second write to occur in program order. A Read after Write (RaW) hazard means that the read must return the data that was written in a preceding operation whilst a Write after Read (WaR) hazard means that the read must return the data before the write happened. If two operations can be issued at the same time special care is needed to make sure the correct values end up in the read register (RaW, WaR) or memory (WaW) if a hazard occurs, and this typically requires specific hardware to be added to deal with such situations.

Unfortunately, the addresses of memory accesses are typically not resolved until after operations are issued. This may for example be due to the fact that the addresses rely on register values that are computed in the immediately preceding operations (and sent via forwarding paths), and/or a calculation may take place to compute the address later in the pipeline. Since the addresses of memory accesses are typically not resolved until after operations are issued, it is often impossible to tell at issue time whether a hazard exists or not (a pessimistic approach of not issuing any pair of memory operations in parallel which could cause a hazard would lead to dramatic under utilization since any pair of two writes or one read and one write can cause a hazard). Hence if more than one of the execution pipelines were to be allowed to handle memory access operations, complex hardware would need to be provided within the superscalar processor to detect such hazards later in the pipeline and deal correctly with the hazards when they occur.

Another type of data processing architecture is the multi-threading architecture, in which a processor has access to a plurality of different sets of registers, each register set being associated with a different execution thread of the processor. Such a multi-threading architecture at the hardware level (i.e. through the provision of multiple register sets) provides significant performance improvements for a data processing apparatus, since by increasing the amount of processing work available at any point in time, this tends to increase the amount of useful work that can be performed by the data processing apparatus at that time. For example, when a particular execution thread reaches a point where a significant delay is incurred, for example due to the requirement to perform a fetch of a data value from memory, then the processor can switch to another execution thread at that time with minimal delay, due to the fact that the execution context of that other execution thread is already available in the associated register set provided for that other execution thread.

It is envisaged that it would be beneficial to seek to incorporate the above multi-threading principles within a superscalar data processing apparatus such as described earlier. However, if such multi-threading capabilities are added to such a superscalar machine, the asymmetric pipelines are likely to adversely impact the overall performance improvements that can be gained, since there will typically be much contention between the various execution threads for use of the memory access capable pipeline, whilst the other pipeline or pipelines are relatively idle. However, if as an alternative symmetric pipelines were used, where each pipeline could handle memory access operations, and operations were freely dispatched to these various execution pipelines in order to seek to maximise throughput, then the hardware required to detect the earlier-discussed hazards that could occur would be very complex, increasing the overall cost and complexity of the superscalar data processing apparatus.

SUMMARY OF THE INVENTION

Viewed from a first aspect, the present invention provides a superscalar data processing apparatus having a plurality of execution threads, each execution thread being operable to process a sequence of operations including at least one memory access operation, the superscalar data processing apparatus comprising: a plurality of execution pipelines operable to execute the operations; issue logic operable to allocate each operation to one of said execution pipelines for execution by that execution pipeline; at least two of said execution pipelines being memory access capable pipelines which are capable of executing memory access operations, each memory access capable pipeline being associated with a subset of said plurality of execution threads; the issue logic being operable, for each execution thread, to allocate any memory access operations of that execution thread to an associated memory access capable pipeline.

In accordance with the present invention, at least two of the execution pipelines (of which there may be two or more) are memory access capable pipelines, and each memory access capable pipeline is associated with a subset of the plurality of execution threads. When the issue logic then needs to allocate a memory access operation of a particular execution thread, it allocates that memory access operation to an associated memory access capable pipeline.

Hence, in accordance with the present invention, multiple memory access capable pipelines are provided, but any particular memory access capable pipeline can only handle memory access operations for a subset of the available execution threads, the subset being less than the entirety of the execution threads.

By such an approach, the required memory access activities that occur within the plurality of execution threads can be spread across multiple execution pipelines, thereby alleviating the earlier described bottleneck that would occur if only one pipeline was used to handle memory access operations. Further, since each particular memory access capable pipeline will only process memory access operations for a subset of the plurality of execution threads, this reduces the hazard detection requirements that would otherwise be required. In particular, each execution thread will typically be used to execute a sequence of instructions from a particular program thread (i.e. a thread in a user program as viewed by the operating system) and since by their nature the individual program threads are intended to execute autonomously from one another, there is no need to perform any hazard detection operations, such as address dependency checking, across different program threads, and any hazards that do in fact exist in such situations are software hazards (i.e. the result of a programming error) which do not need to be resolved by the hardware. As a result, hazard detection only needs to be implemented between memory access capable pipelines that can handle memory access operations from the same execution thread, i.e. where there is some overlap between the subset of execution threads associated with one memory access capable pipeline and the subset of execution threads associated with a different memory access capable pipeline.

It should be noted that the sequence of operations may occasionally include special memory operations which are used for synchronisation between threads, which need to be executed atomically. For such memory operations, hazard detection is required between all threads, but can be implemented by ensuring that for such memory operations no other memory operations are issued during the same cycle. Since occurrence of these special memory operations are rare, the performance impact of such an approach is minimal. Further the approach is easy to implement.

In one embodiment, each execution thread is associated with one of the memory access capable pipelines. As a result, there will be no overlap between the subset of execution threads associated with one memory access capable pipeline and the subset of execution threads associated with another memory access capable pipeline and accordingly the need to provide hazard detection hardware can be avoided, since as mentioned earlier there is no need for hardware to detect hazards between different execution threads.

In embodiments where any particular memory access capable pipeline can handle memory access requests from more than one execution thread, then it is useful to provide that memory access capable pipeline with "Hit under Miss" capability, such that if execution of a memory access operation of one execution thread causes a cache miss to occur, thereby incurring a delay before the data the subject of the memory access request can be accessed, the pipeline can continue to service memory access requests from a different execution thread while the original memory access request is being resolved. In a traditional single threaded superscalar machine such Hit under Miss capability has often been considered unnecessary, since it is generally the case that data the subject of a load instruction is used by another instruction shortly thereafter, and hence there is little overall performance benefit to be gained from allowing any intervening load/store instructions to be processed. However, in a multi-threaded system, given that the threads are generally autonomous to each other, this premise does not hold, and it would be useful to provide such Hit under Miss capability. However, the provision of such Hit under Miss capability will add to the complexity of the apparatus.

In one embodiment, each subset comprises one of the execution threads, and hence each memory access capable pipeline only has one execution thread associated with it. The additional benefit residing from such an approach is that each memory access capable pipeline does not need to be able to handle Hit under Miss operations. Instead, if execution of a memory access operation for a particular thread causes a cache miss, then the load/store part of the pipeline can remain blocked while the memory access is resolved since the only other memory access operations that will have been routed to that pipeline will pertain to the same thread. In the meantime, if the memory access capable pipeline has capability to handle execution of other operations, for example general data processing operations, then any such operations pertaining to different threads can be executed within that memory access capable pipeline since execution of the sequence of operations relating to other threads does not need to be halted pending the outcome of the cache miss.

In one embodiment, the sequence of operations processed by each execution thread are executed in an original program order of instructions specifying those operations, and if for a particular execution thread execution of a memory access operation by the associated memory access capable pipeline causes subsequent operations in the sequence to be stalled for a number of cycles, operations being processed by other execution threads are arranged to continue execution during said number of cycles. This enables the benefits of a multi-threading architecture to be realised within the superscalar data processing apparatus since useful work can still be performed by the execution pipelines of the data processing apparatus whilst one of the execution threads is stalled.

The data the subject of memory access requests can be stored in a variety of locations within the data processing apparatus. However, typically a cache is provided within such a data processing apparatus to allow more ready access to a subset of data stored in memory. In one embodiment, each memory access capable pipeline comprises load/store logic for issuing access requests to a cache used to hold data values for access by the memory access capable pipelines, the cache being operable to process in parallel access requests from the load/store logic of multiple memory access capable pipelines.

One way in which the cache can be arranged to process multiple access requests in parallel is to use multi-ported RAM (Random Access Memory) for storing the data within the cache. However, multi-ported RAM is more costly than single-ported RAM, and accordingly this will increase the cost of the data processing apparatus.

In an alternative embodiment, the cache comprises a plurality of cache ways arranged into a plurality of groups, each load/store logic being associated with one of said groups, on receipt of an access request from a particular load/store logic, the cache being operable to perform a lookup procedure in the associated group, whereby multiple lookup procedures to different groups can be performed in parallel. In such an embodiment, single-ported RAM can be used to implement each of the cache ways, since each load/store logic is operable by default to access a different group, hence allowing access requests to be processed in parallel.

With such an embodiment, whilst a cache hit can result in the data being accessed in the standard manner, a cache miss signal will not necessarily indicate that the data is not to be found in the entirety of the cache, but only will indicate that the data is not found in the particular group that has been accessed. In one embodiment, if the lookup procedure results in a cache miss, then in a subsequent cycle the cache is operable to perform the lookup procedure in a different group of cache ways in preference to handling an access request from the load/store logic associated with that different group. In one embodiment, in this subsequent cycle all pipelines are stalled whilst this additional lookup takes place so as to maintain the "in-order processing". Depending on the number of groups within the cache, this process may need to be repeated for each of the different groups until such time as a cache hit occurs, or all groups have been checked. Whilst such a process will incur some delay in situations where a cache hit is not found in the original group in which the lookup procedure is performed, this disadvantage will in some embodiments be considered to be outweighed by the reduction in cost of the cache, through the avoidance of the need for multi-ported RAM. In one particular embodiment, the cache is divided into two groups, and the superscalar data processing apparatus comprises two execution threads, each execution thread having its own associated memory access capable pipeline.

The cache may be located either within the data processing apparatus itself, or external thereto.

In one embodiment, when data is allocated into the cache following a cache miss, it is preferably allocated in a group associated with the relevant thread to prevent subsequent accesses from causing stalls. As a further enhancement, in one embodiment data can be migrated between groups with the aim of preventing future stall cycles.

In one particular embodiment, the plurality of execution threads comprise two execution threads, and said plurality of execution pipelines comprise two memory access capable pipelines, each memory access capable pipeline being associated with one of said execution threads. Within such an embodiment, the actual total number of execution pipelines provided can be two or greater than two. For example, in one embodiment, the two memory access capable pipelines may between them be able to process any operations from the two execution threads, and in such instances it may be considered unnecessary to provide any additional execution pipelines. However, in other embodiments additional execution pipelines can be provided to execute operations other than memory access operations, for example addition operations, multiplication operations, etc.

Viewed from a second aspect, the present invention provides a method of processing operations within a superscalar data processing apparatus having a plurality of execution threads, each execution thread being operable to process a sequence of operations including at least one memory access operation, the superscalar data processing apparatus comprising a plurality of execution pipelines operable to execute the operations, at least two of said execution pipelines being memory access capable pipelines which are capable of executing said memory access operations, the method comprising the steps of: allocating each operation to one of said execution pipelines for execution by that execution pipeline; associating each memory access capable pipeline with a subset of said plurality of execution threads; and for each execution thread, allocating any memory access operations of that execution thread to an associated memory access capable pipeline.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
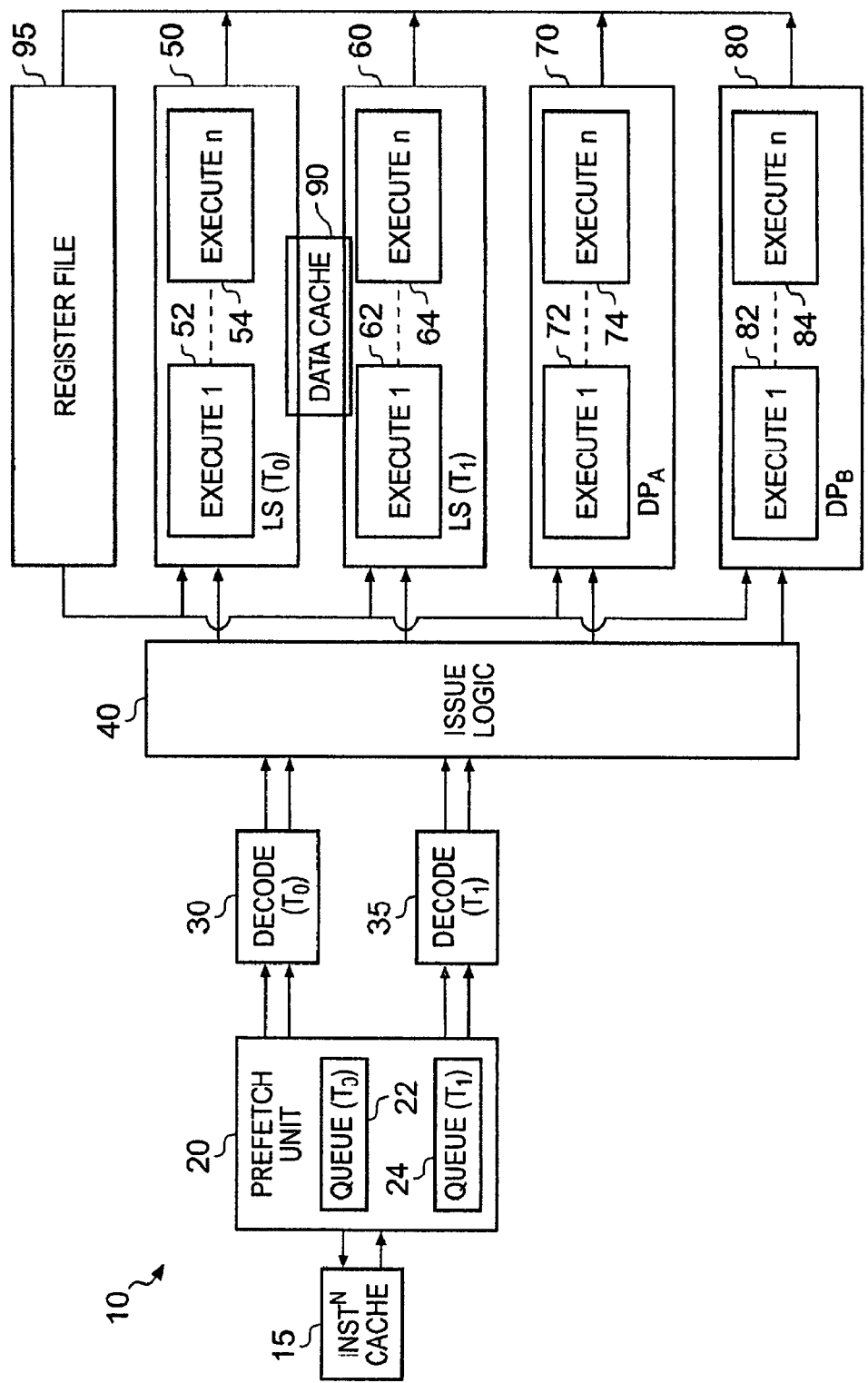
FIG. 1 is a block diagram of a data processing apparatus in accordance with one embodiment of the present invention.

FIG. 1 is a block diagram of a data processing apparatus 10 in accordance with one embodiment of the present invention. This superscalar data processing apparatus 10 has four execution pipelines 50, 60, 70, 80, each of which contain a number of pipeline stages 52, 54, 62, 64, 72, 74, 82, 84.

As will be discussed in more detail later, the data processing apparatus 10 has multiple execution threads, each of which can process a sequence of operations specified by a corresponding sequence of instructions. In one embodiment the sequence of instructions may be defined by a program thread. Issue logic 40 is used to decide which execution pipeline 50, 60, 70, 80 should execute any particular operation. A register file 95 is provided within the data processing apparatus 10 for storing data required by the various pipelined execution units 50, 60, 70, 80 when executing operations, the data required when processing a particular operation being routed from the register file into the relevant execution pipeline along with the operation dispatched from the issue logic 40, and any result data output by the execution pipeline then being returned to the register file 95 for storing in a destination register. Typically, the last execute stage in each pipeline is a write back stage used to perform the required write back operation to store the result data value in the register file 95.

The register file 95 actually consists of a plurality of sets of registers, one set being provided for each execution thread. This enables the data processing apparatus to easily switch between different execution threads as and when required, and indeed enables one execution pipeline to be executing an operation from one execution thread, whilst a different execution pipeline is executing an operation from another execution thread.

An instruction cache 15 is provided for storing instructions for access by prefetch unit 20. Prefetch unit 20 is responsible for prefetching instructions for processing by the various execution threads with the aim of ensuring that there are always available instructions to be routed to decode logic for decoding into operations for issuance by the issue logic 40 to the execution pipelines 50, 60, 70, 80 as and when required. In the particular example illustrated in FIG. 1, it is assumed that there are two execution threads, referred to herein as $T_0$ and $T_1$. Within the prefetch unit 20, separate instruction queues 22, 24 are maintained for each execution thread and instructions are then retrieved from the prefetch unit 20 by decode logic 30, 35 associated with each execution thread. In particular, up to two instructions per clock cycle can be retrieved from the queue 22 for thread zero by the associated decode logic 30, and in addition up to two instructions per clock cycle can be retrieved from the queue 24 for thread one by the associated decode logic 35. These instructions are then decoded by the respective decode logic 30, 35 to produce corresponding operations for execution by the execution pipelines.

The issue logic 40 is arranged to dispatch up to two operations per clock cycle to the execute pipelines. Hence, the issue logic will take 0, 1 or 2 operations from the decode logic 30, 35 each cycle and will feedback to the decode logic how many were taken so that they can update accordingly. This in turn will affect how many instructions are retrieved from the prefetch queues by each decode logic 30, 35.

The prefetch unit 20 monitors the queues 22, 24 and continues to prefetch instructions from the instruction cache 15 with the aim of ensuring that the queues 22, 24 always have instructions that can be output to the decode logic 30, 35. The prefetch unit 20 can include prediction logic for predicting which instructions should be fetched, and accordingly in such embodiments can, for example, make a prediction about the outcome of a branch instruction, and as a result of that prediction determine which instruction to prefetch next from the instruction cache 15. As will be appreciated by those skilled in the art, if a prediction made by the prefetch unit 20 later proves to be incorrect, the affected operations are flushed from the apparatus, and execution is resumed from the instruction that should have been executed following the incorrectly predicted branch instruction.

Further, as will be appreciated by those skilled in the art, if an instruction requested by the prefetch unit 20 is not available in the instruction cache 15, then a memory access request is propagated from the instruction cache 15 to the memory system (which itself may include one or more further levels of cache), resulting in the required instruction being returned to the instruction cache 15, from where it can then be provided to the prefetch unit 20.

In accordance with the embodiment of FIG. 1, two of the execution pipelines 50, 60 are memory access capable pipelines, and accordingly can execute load or store operations. Furthermore, in accordance with the embodiment illustrated in FIG. 1, the execute pipeline 50 is associated with thread zero and the execution pipeline 60 is associated with thread one. As a result, the issue logic 40 will issue any load or store operations pertaining to thread zero to the execution pipeline 50, and similarly will issue any load or store operations pertaining to thread one to the execution pipeline 60. When processing the load or store operations, these pipelines will issue memory access requests to the data cache 90 to seek to access the required data in order to enable the required data to either be loaded into the register file 95 from memory, or stored from the register file 95 to memory. As will be discussed in more detail later with reference to FIG. 3, the data cache can in some embodiments be considered to at least partially reside within the execution pipelines 50, 60, and in particular the load/store logic provided to perform lookups within the cache can be considered to reside within these execution pipelines.

In an analogous way to that discussed earlier with reference to the instruction cache, if a cache miss occurs within the data cache, then the data cache 90 will propagate a memory access request to other parts of the memory system in order to cause the required data to be accessed. In particular, a cache miss will typically cause a linefill process to take place as a result of which a line of data is retrieved into the data cache 90. In the example of a load operation, this will then enable the required data to be provided to the relevant execution pipeline 50, 60. In the event of a store operation, the store data can then be written to the line retrieved into the cache. Depending on whether the data cache is a write through or a write back type of data cache, the store data may or may not at that time be propagated on to memory.

The memory access capable pipelines 50, 60 may be arranged solely to process load or store operations, or alternatively may be able to also handle a number of different types of operations in addition to any load or store operations. In addition to the memory access capable pipelines, one or more additional pipelines 70, 80 may be provided for executing operations other than load or store operations, these operations generally being referred to herein as data processing operations. Hence, the execution pipeline 70 can be referred to as data processing pipeline A, whilst the execution pipeline 80 can be referred to as data processing pipeline B. Data processing operations from either thread can be issued to any execution pipeline capable of handling those operations, subject to register availability.

Figure 2:
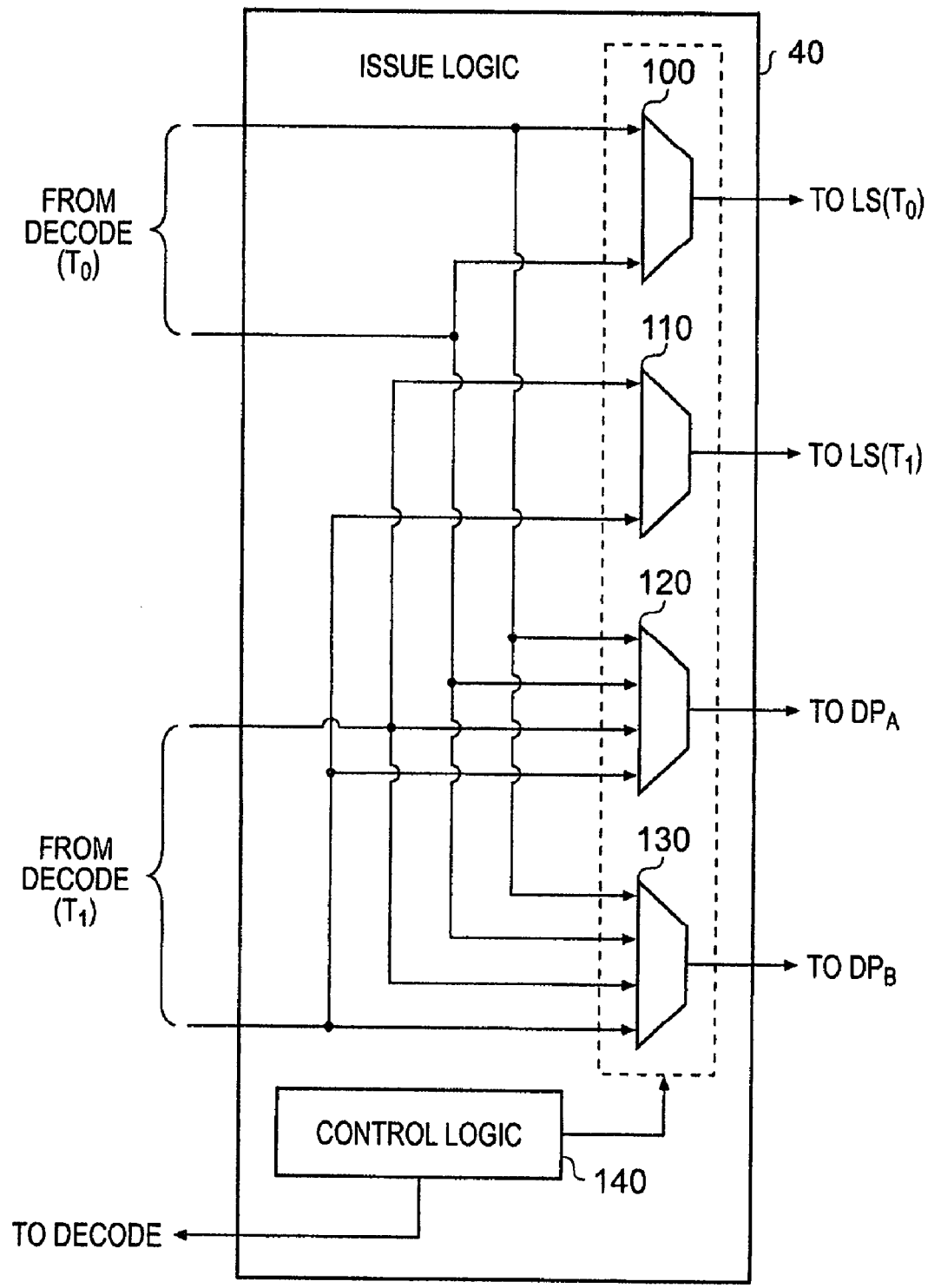
FIG. 2 is a diagram illustrating in more detail the operation of the issue logic of FIG. 1.

FIG. 2 is a diagram illustrating in more detail the operation of the issue logic 40 in accordance with one embodiment. In particular, FIG. 2 illustrates the logic that may be provided to route the operations received from the decode logic 30, 35 to the relevant execution pipelines. In particular, the issue logic 40 can be considered to comprise a sequence of multiplexers 100, 110, 120, 130, each multiplexer being associated with one of the execution pipelines 50, 60, 70, 80. As can be seen from FIG. 2, the two operations from decode logic 30, i.e. the two operations pertaining to thread zero, are routed to the multiplexers 100, 120, 130, whilst the two operations from decode logic 35, i.e. the two operations pertaining to thread one, are routed the multiplexers 110, 120, 130. Control logic 140 is then provided for analysing the received operations and determining which operations should be issued (up to a maximum of two per clock cycle in this embodiment), and to which pipelines those operations should be issued. This determination can be made using general principles applied by issue logic within superscalar systems, but taking into account the fact that two of the operations received are from a different thread to the other two operations. Hence, by way of example, some factors that the control logic 140 can take into account when determining which operations should be issued include: which threads have operations ready to execute, whether the next operation from a particular thread can be executed in parallel, any preference for one thread over the other. Sometimes there may be special memory operations which are used for synchronisation between threads, which need to be executed atomically. For such memory operations, the control logic 140 will not issue any other memory operations during the same cycle.

The control logic 140 in making its decision takes into account the fact that any load/store operations from thread zero can only be issued to the execution pipeline 50 and any load/store operations from thread one can only be issued to the execution pipeline 60. Any other data processing operations can be issued to any of the pipelines that are capable of handling such operations. However, in the example of FIG. 2 it is assumed that the execution pipelines 50, 60 only handle load or store operations and accordingly there is never any need to issue non-load/store operations from thread one into execution pipeline 50 or non-load/store operations from thread zero into execution pipeline 60.

When the control logic 140 has determined which operations to issue into the execution pipeline, and which execution pipelines 50, 60, 70, 80 to issue those operations to, it sends appropriate control signals to the multiplexers 100, 110, 120, 130, and also returns a signal to the decode logic 30, 35 to identify which operations have been issued.

Figure 3:
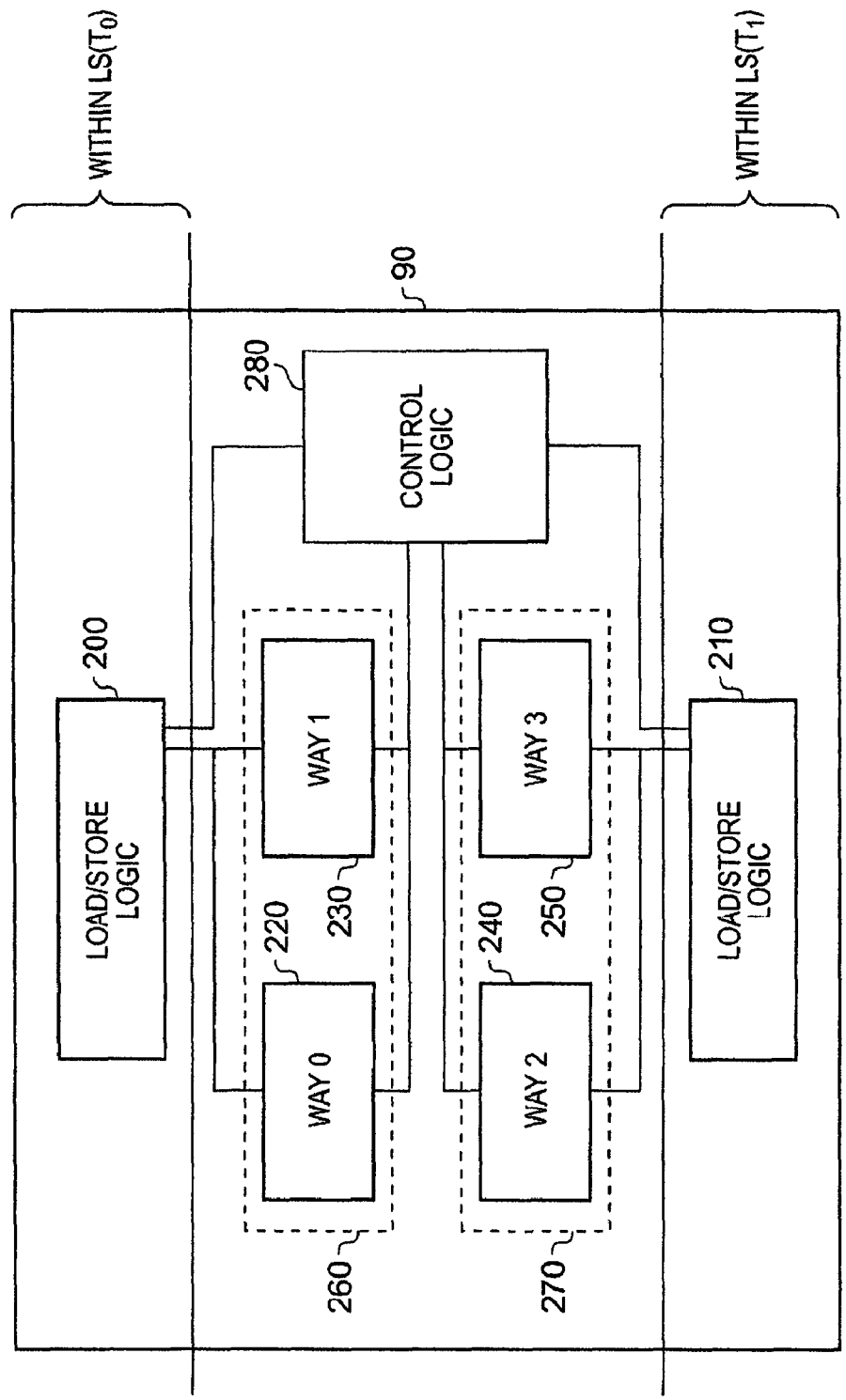
FIG. 3 is a block diagram illustrating in more detail the operation of the data cache of FIG. 1.

FIG. 3 is a block diagram illustrating in more detail the operation of the data cache 90 in accordance with one embodiment. In the embodiment illustrated in FIG. 3, it is assumed that the data cache 90 is a four way set associative cache, and each of the ways 220, 230, 240, 250 are implemented as single-ported RAM. The data cache 90 also includes load/store logic 200 associated with execution pipeline 50 and load/store logic 210 associated with execution pipeline 60.

In accordance with the embodiment shown, the data cache is considered as consisting of two separate groups 260, 270 of ways, group 260 containing ways 0 and 1, and group 270 containing ways 2 and 3.

When a load or store operation is executed within execution pipeline 50, then at some point the load/store logic 200 will issue an access request to the ways of the group 260 which will result in either a cache hit or a cache miss being detected dependent on whether the data to be accessed is present within the group 260. Meanwhile, at the same time, the load/store logic 210 can issue an access request resulting from a load or store operation being executed by execution pipeline 60, and this access request is directed to the group 270, again this resulting in either a cache hit or a cache miss signal being generated dependent on whether the data to be accessed is present within the group 270.

If a memory access request issued in such a manner results in a cache miss, then the relevant load/store logic 200, 210 contacts the control logic 280, and the control logic 280 then in a subsequent clock cycle accesses the other group of ways in order to determine whether the data the subject of the access request is present in those ways. Accordingly, by way of example, if an access request issued by the load/store logic 200 to group 260 results in a cache miss, then in a subsequent cycle the control logic 280 will issue the same access request to the group 270. Similarly, if a memory access request issued by the load/store logic 210 to the group 270 resulted in a cache miss, then in a subsequent clock cycle the control logic 280 issues the same access request to the group 260 to determine whether the data value the subject of the access request is present in either way 0 or way 1.

In one embodiment, if this secondary lookup needs to be performed by control logic 280, then whilst that lookup procedure is being performed, all pipelines are stalled so as to maintain the in-order processing of operations.

Whilst such an approach can introduce delays in situations where such a secondary lookup procedure is required, it significantly reduces the cost of the data cache 90, which otherwise would need to employ dual-ported RAM to implement each of the ways 220, 230, 240, 250 in order to allow both load/store logic units 200, 210 to access those ways simultaneously.

In one embodiment, when data is allocated into the data cache 90 following a cache miss, it is preferably allocated in a bank associated with the relevant thread to prevent subsequent accesses from causing stalls. As a further enhancement, in one embodiment data can be migrated between banks with the aim of preventing future stall cycles.

Figure 4:
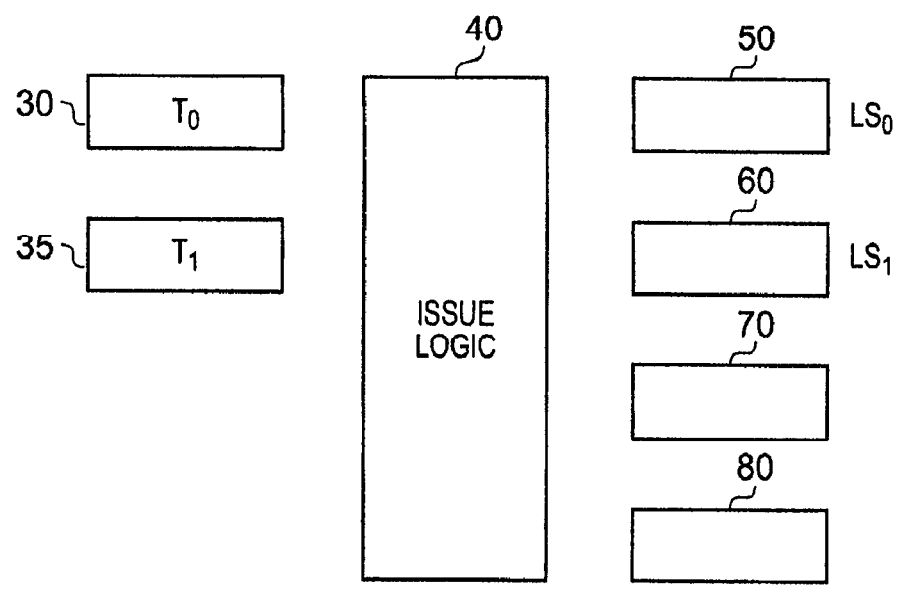
FIGS. 4 to 7 schematically illustrate four different embodiments of the present invention.

FIGS. 4 to 7 are diagrams schematically illustrating alternative embodiments of the present invention. FIG. 4 schematically illustrates the embodiment shown in more detail in FIG. 1, i.e. where there are two execution threads $T_0$ and $T_1$, and there are four execution pipeline provided, two of which are memory access capable pipelines (one memory access capable pipeline being associated with each thread). More particularly, as shown in FIG. 4, decode logic 30 is associated with thread zero whilst decode logic 35 is associated with thread one. The issue logic 40 is then arranged to dispatch each operation to the appropriate one of the four execution pipelines 50, 60, 70, 80, any load/store operations pertaining to thread zero being issued to execution pipeline 50, and any load/store operations pertaining to thread one being issued to execution pipeline 60.

An alternative embodiment is shown in FIG. 5, where again there are two threads $T_0$ and $T_1$ which can be executed by the data processing apparatus, but in this example there are only two execution pipelines in total. Accordingly, decode logic 300 handles the decoding of instructions pertaining to thread zero whilst decode logic 310 handles the decoding of instructions pertaining to thread one. The issue logic 320 is then arranged to issue the corresponding operations to either the execution pipeline 330 or the execution pipeline 340. In doing so, any load/store operations pertaining to thread zero are routed to execution pipeline 330, whilst any load/store operations pertaining to thread one are routed to execution pipeline 340.

In this embodiment, it is envisaged that each of the execution pipelines 330, 340 can execute other operations as well as load/store operations. The pipelines may be symmetric, in that they can both handle exactly the same type of operations, or may be asymmetric such that certain operations can be handled by one pipeline but not the other. In this latter case, this will generally mean that data processing operations of a particular type are routed to the one of the pipelines whilst data processing operations of another type are routed to the other of the pipelines, irrespective of which thread those operations pertain to. Hence, whilst load/store operations of thread zero are restricted to be issued to the pipeline 330, other operations of thread zero are not so limited, and can be routed to either pipeline as appropriate. Similarly, whilst load or store operations pertaining to thread one must be issued to pipeline 340, other operations pertaining to thread one can again be issued to either pipeline as appropriate.

Figure 5:
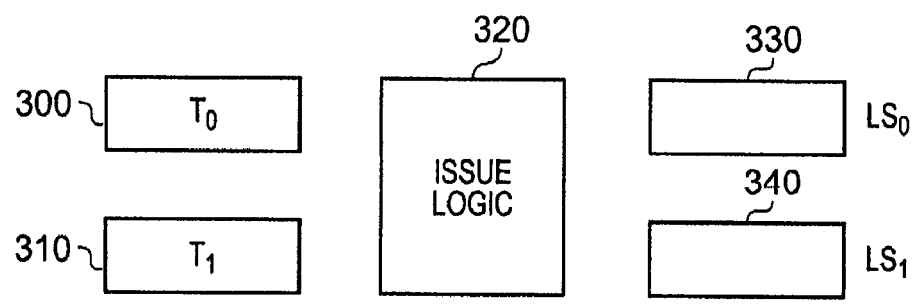

Whilst the embodiment of FIG. 5 may not achieve the same overall performance as the embodiment of FIG. 4, due to the reduced number of execution pipelines, it may provide a more cost effective solution in some embodiments. Both of the embodiments of FIGS. 4 and 5 avoid the inefficiencies that can occur if too much of the load/store processing has to be performed by only one pipeline, and further avoids any hazard detection difficulties that would arise if more than one pipeline were allowed to handle load or store operations for the same thread. Further, these embodiments avoid the need to provide any "Hit under Miss" capability since each memory access capable pipeline can only handle load or store operations from a single thread.

Figure 6:
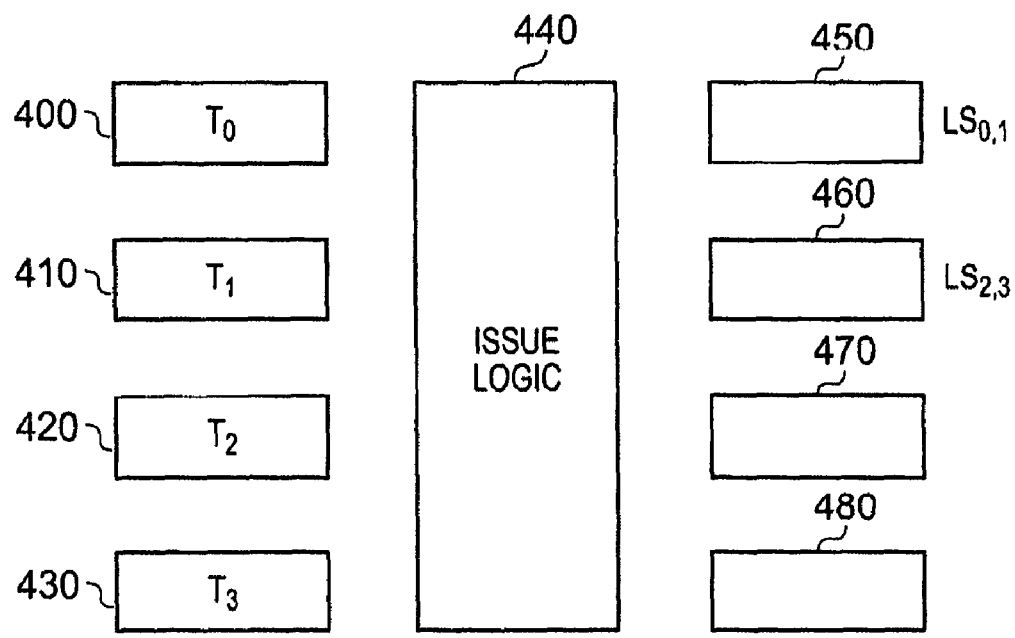

FIG. 6 illustrates an alternative embodiment which is somewhat analogous to the embodiment of FIG. 4, but in this instance there are four execution threads rather than two. Accordingly, decode logic 400 is provided for decoding instructions pertaining to thread zero, decode logic 410 is provided for decoding instructions pertaining to thread one, decode logic 420 is provided for decoding instructions pertaining to thread two, and decode logic 430 is provided for decoding instructions pertaining to thread three. The issue logic 440 then issues corresponding operations from these four threads to the appropriate execution pipelines 450, 460, 470, 480. In this example, like the example of FIG. 4, only two of the pipelines, namely pipelines 450 and 460, are memory access capable pipelines, but in this embodiment the pipeline 450 handles load or store operations for threads zero or one, whilst the pipeline 460 handles load or store operations for threads two or three. As with the embodiments of FIGS. 4 and 5, the use of multiple memory access capable pipelines avoids the inefficiencies that can arise if only a single memory access capable pipeline is provided for performing all of the load or store processing of the data processing apparatus, and also the need to detect hazards is avoided given that only a single memory access capable pipeline handles the load or store operations pertaining to a particular thread. However, in this embodiment, it would be beneficial to provide some Hit under Miss capability, such that for example if a cache miss occurs when processing a memory access operation for thread zero, the execution pipeline 450 can still continue to execute load or store operations for thread one whilst the memory access request for thread zero is being resolved.

Figure 7:
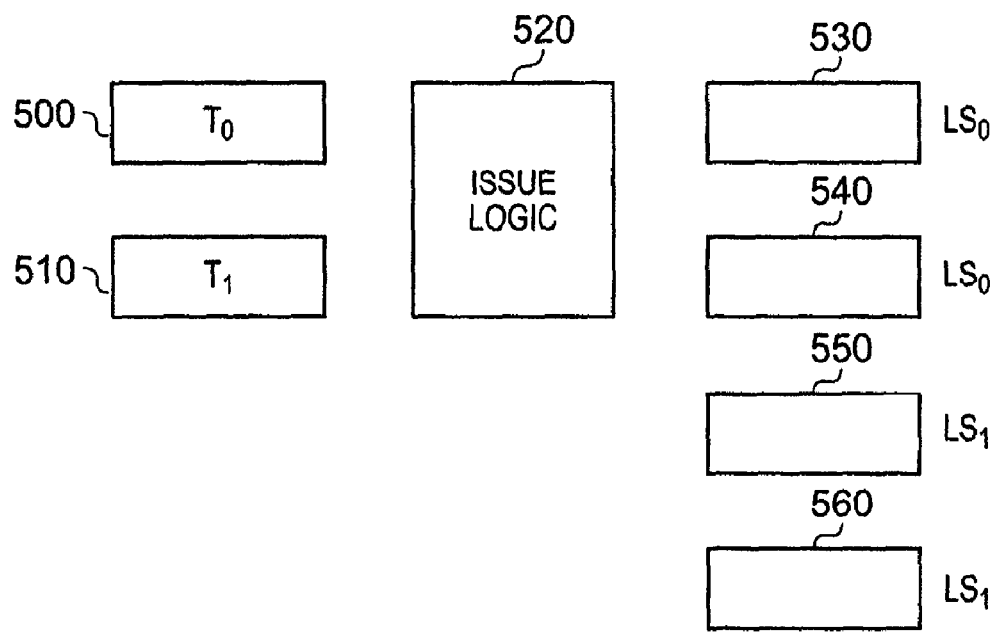

FIG. 7 illustrates an alternative embodiment that may be used to implement a high performance dual thread system. In this embodiment, as with FIG. 4, the system supports execution of two threads, and there are four execution pipelines. However, in this embodiment, each of the pipelines is a memory access capable pipeline. Hence, decode logic 500 is provided for decoding instructions from thread zero, decode logic 510 is provided for decoding instructions from thread one, and issue logic 520 is provided for issuing the corresponding operations to the appropriate execution pipelines 530, 540, 550, 560. In accordance with the embodiment of FIG. 7, load or store operations from thread zero can be dispatched to either pipeline 530 or pipeline 540, whilst load or store operations from thread one can be dispatched to either pipeline 550 or 560. It is expected that such a system would enable high throughput to be achieved, and results in the processing of load and store operations being spread over the various pipelines. Given that any particular memory access capable pipeline only handles memory access operations pertaining to one thread, then there is no requirement to provide any Hit under Miss capability. However, since for a particular thread there are two memory access capable pipelines that can handle the load or store operations of that thread, then there will be a need to provide some hazard detection logic. However, such hazard detection logic will be significantly less complex than would be the case if each of the four pipelines could handle load or store operations from any thread. In particular, there is only need to perform hazard detection checking between the pipelines 530 and 540 for load or store operations pertaining to thread zero, and separately to perform hazard detection between pipelines 550 and 560 for load or store operations pertaining to thread one.

From the above description of embodiments of the present invention, it will be appreciated that such embodiments provide an effective balance between increasing the efficiency of operation of the superscalar data processing apparatus when employing multiple execution threads, whilst also alleviating the need for complex hardware to handle hazard detection.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A superscalar data processing apparatus having a plurality of execution threads, each execution thread being operable to process a sequence of operations including at least one memory access operation, the superscalar data processing apparatus comprising:

a plurality of execution pipelines operable to execute the operations;

issue logic operable to allocate each operation to one of said execution pipelines for execution by that execution pipeline;

at least two of said execution pipelines being memory access capable pipelines which are capable of executing memory access operations, each memory access capable pipeline being associated with only a subset of said plurality of execution threads for the purpose of executing memory access operations, said subset is less than all of said plurality of execution threads;

the issue logic being operable, for each execution thread, to allocate any memory access operations of an execution thread to an associated memory access capable pipeline.

2. A superscalar data processing apparatus as claimed in claim 1, wherein each execution thread is associated with one of said memory access capable pipelines.

3. A superscalar data processing apparatus as claimed in claim 1, wherein said subset comprises one of said execution threads.

4. A superscalar data processing apparatus as claimed in claim 1, wherein within each execution thread the sequence of operations processed by an execution thread are executed in an original program order of instructions specifying those operations, and if for a particular execution thread execution of a memory access operation by the associated memory access capable pipeline causes subsequent operations in the sequence to be stalled for a number of cycles, operations being processed by other execution threads are arranged to continue execution during said number of cycles.

5. A superscalar data processing apparatus as claimed in claim 1, wherein each memory access capable pipeline comprises load/store logic for issuing access requests to a cache used to hold data values for access by the memory access capable pipelines, the cache being operable to process in parallel access requests from the load/store logic of multiple memory access capable pipelines.

6. A superscalar data processing apparatus as claimed in claim 5, wherein the cache comprises a plurality of cache ways arranged into a plurality of groups, each load/store logic being associated with one of said groups, on receipt of an access request from a particular load/store logic, the cache being operable to perform a lookup procedure in the associated group, whereby multiple lookup procedures to different groups can be performed in parallel.

7. A superscalar data processing apparatus as claimed in claim 6, wherein if the lookup procedure results in a cache miss, then in a subsequent cycle the cache is operable to perform the lookup procedure in a different group of cache ways in preference to handling an access request from the load/store logic associated with that different group.

8. A superscalar data processing apparatus as claimed in claim 5, wherein the cache is provided within the data processing apparatus.

9. A superscalar data processing apparatus as claimed in claim 1, wherein said plurality of execution threads comprise two execution threads, and wherein said plurality of execution pipelines comprise two memory access capable pipelines, each memory access capable pipeline being associated with one of said execution threads.

10. A method of processing operations within a superscalar data processing apparatus having a plurality of execution threads, each execution thread being operable to process a sequence of operations including at least one memory access operation, the superscalar data processing apparatus comprising a plurality of execution pipelines operable to execute the operations at least two of said execution pipelines being memory access capable pipelines which are capable of executing said memory access operations, the method comprising the steps of:

allocating each operation to one of said execution pipelines for execution by that execution pipeline;

associating each memory access capable pipeline with only a subset of said plurality of execution threads for the purpose of executing memory access operations, said subset is less than all of said plurality of execution threads; and for each execution thread, allocating any memory access operations of an execution thread to an associated memory access capable pipeline.

* * * * *